(No Model.)
W. FORMAN.
Expansion Joint.
No. 238,775. Patented March 15, 1881.
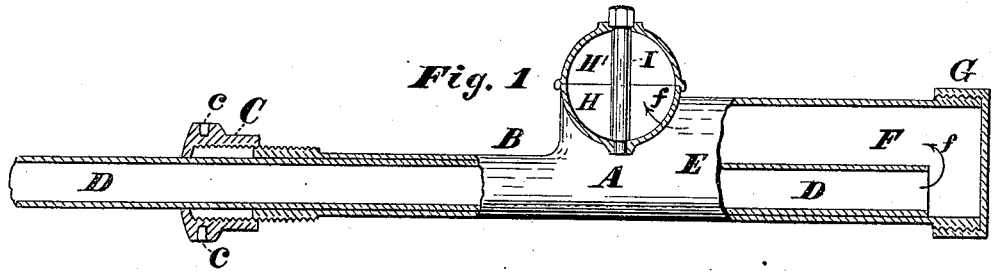
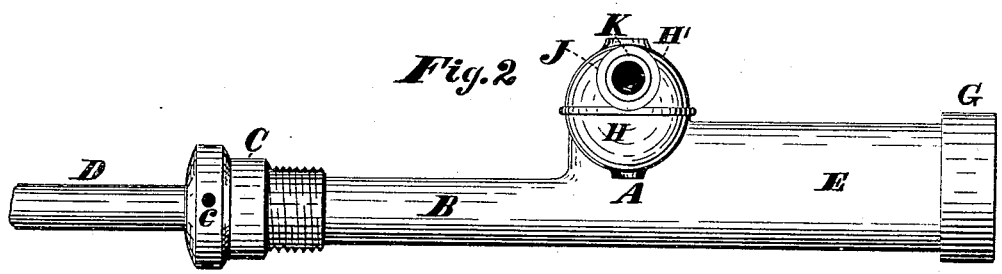
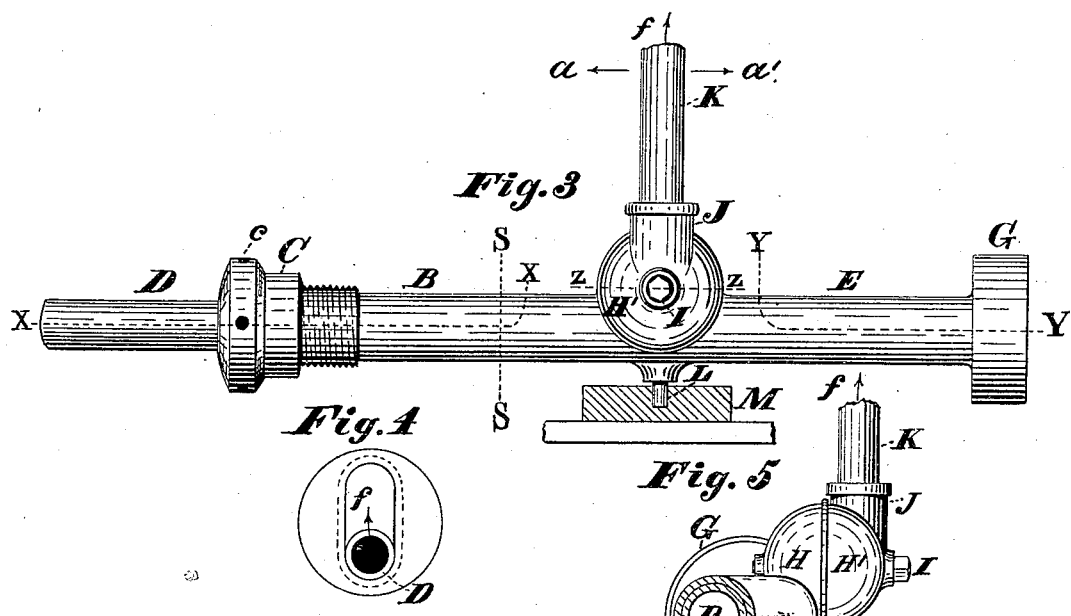
Witnesses.
Joseph Schenk.
S. A. Brown
Inventor.
William Forman
By James Sangster
atty.

UNITED STATES PATENT OFFICE.

WILLIAM FORMAN, OF BRADFORD, PENNSYLVANIA.

EXPANSION-JOINT.

SPECIFICATION forming part of Letters Patent No. 238,775, dated March 15, 1881.

Application filed January 22, 1881. (No model.)

*To all whom it may concern:*

Be it known that I, WILLIAM FORMAN, a citizen of the United States, residing in Bradford, in the county of McKean and State of Pennsylvania, have invented certain new and useful Improvements in Expansion-Joints, of which the following is a specification.

The object of my invention is to provide for the expansion and contraction of steam-pipes without springing or bending them, particularly in long lines of pipes, where the expansion and contraction occasioned by the steam as it is let in or off is great, sometimes reaching twelve or thirteen inches or more; and the invention consists of a cylinder or case, one portion of which is provided with a stuffing-box, and adapted to receive one end of a line of steam-pipe and hold it steam-tight, while allowing an easy longitudinal movement of the same, and the other portion, which is of larger diameter, is provided with a passage for conducting the steam to another pipe jointed thereto, as and for purposes which will be more clearly hereinafter shown by reference to the drawings, in which—

Figure 1 is a top view, showing a central longitudinal section through lines X X, Y Y, and Z Z of Fig. 3. Fig. 2 is a top view. Fig. 3 represents a side elevation; Fig. 4, an end view of the larger portion of the case without the cap; and Fig. 5 is a section through line S S, Fig. 3.

A represents the case; B, the smaller or cylindrical portion. It is provided with a stuffing-box, C, arranged to screw on, in the usual way, by means of a wrench or bar made to fit the holes c. The part D of a line of steam-pipe is turned true, so as to fit the stuffing-box and tube or cylinder B and work smooth and easy. The end of the pipe D passes through the portion B into the part E, which is of larger diameter, so as to leave a free passage, F, leading into the pipe K. The part E of the case A, which is oblong in cross-section, as shown in Fig. 5, so as to leave room for the passage F, is made round at the end, as shown in Fig, 4, so as to receive the screw-cap G. The pipe K is fastened to the case A by means of a hollow joint, one part of which, H, forms a part of the case A; the other part, H', is closely fitted to it, so as to turn and be steam-tight, the two parts of the joint being securely held together by the bolt I. The case A is supported and held securely in place by means of a bearing, L, which fits into a hole in the floor or other suitable support, M. (See Fig. 3.) By this arrangement any amount of expansion or contraction can be provided for in the line of pipe D, and the pipe K can turn on the joint H H' in the direction of either of the arrows, $a$ or $a'$, shown in Fig. 3, which also provides for the expansion and contraction of any line of pipes that may be connected with the said pipe K, which pipe can be set to any angle required to the pipe D. The steam entering the pipe K from the pipe D passes in the direction of the arrows $f$. (Shown in Figs. 1, 3, and 5.)

I claim as my invention—

An expansion-joint consisting of the case A, having the closed portion E, passage F, leading to the pipe K, substantially as specified, and a cylindrical portion, B, provided with a stuffing-box, in combination with the pipe D, for the purposes described.

WILLIAM FORMAN.

Witnesses:
JAMES SANGSTER,
H. SANGSTER.